J. L. RUDOLPH.
BUSHING REMOVER.
APPLICATION FILED FEB. 26, 1921.
1,424,261.
Patented Aug. 1, 1922.
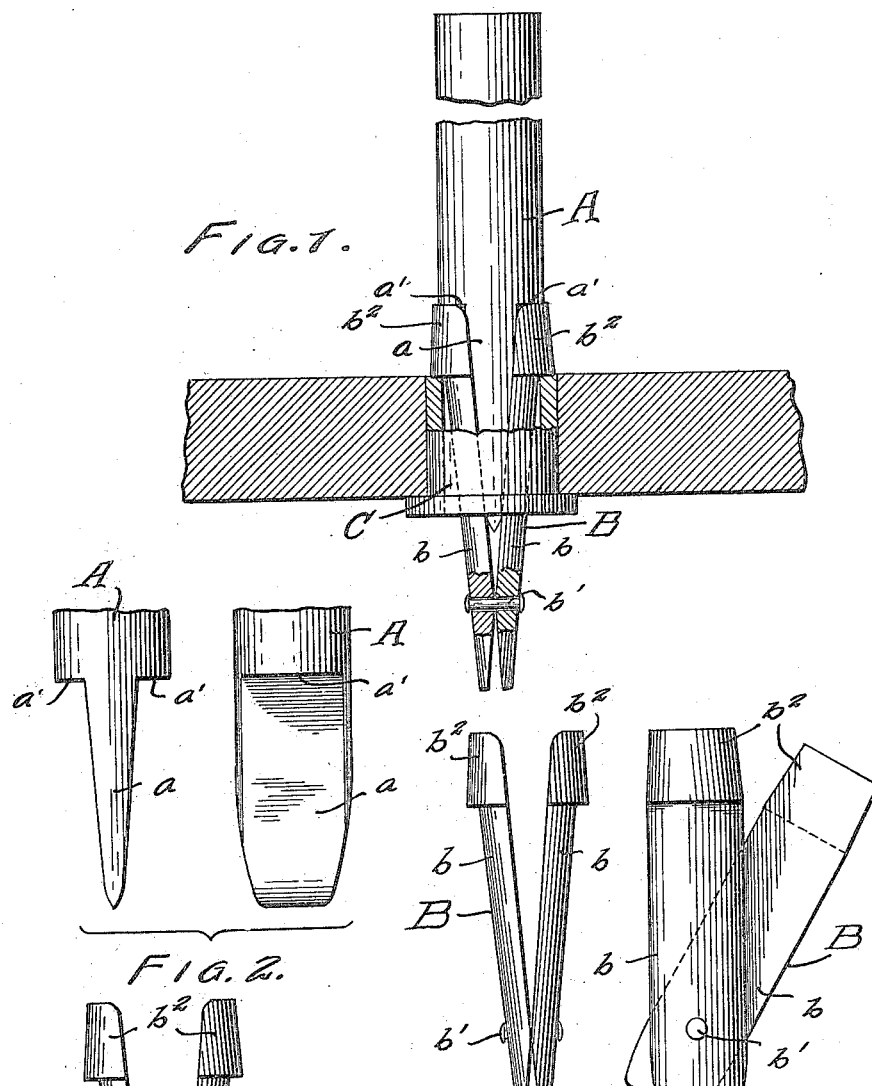
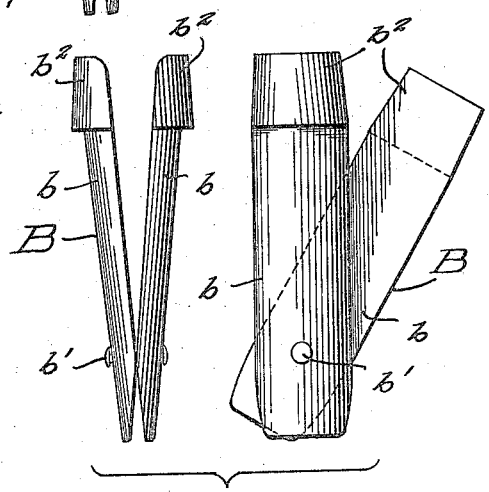
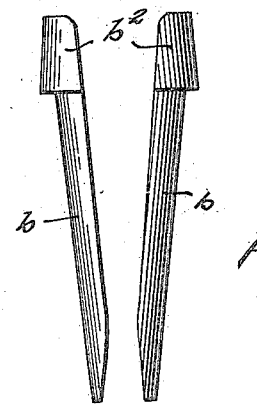
Inventor
John L. Rudolph
By Beale & Park
Attorney

UNITED STATES PATENT OFFICE.

JOHN L. RUDOLPH, OF DELANO, MINNESOTA.

BUSHING REMOVER.

1,424,261.   Specification of Letters Patent.   Patented Aug. 1, 1922.

Application filed February 26, 1921. Serial No. 447,985.

*To all whom it may concern:*

Be it known that I, JOHN L. RUDOLPH, a citizen of the United States, residing at Delano, in the county of Wright and State of Minnesota, have invented certain new and useful Improvements in Bushing Removers; and I hereby declare that the following is a full, clear, and exact description thereof, reference being had to the accompanying drawings, which form part of this specification.

My invention relates to a simple and handy tool for removing bushings; spindle body bushings and piston bushings especially.

Another object is to provide a bushing remover of simple construction and a positive driving bearing while at the same time supporting the bushing from the inside, thus avoiding the danger of having the bushing collapse while it is being removed.

Still another object is to provide a positive driving surface so designed and the members thereof so arranged that when once in place the driving operation may be continued until the bushing is removed, without fear of the expander slipping or the bushing collapsing.

Referring to the drawings; Fig. 1 is an elevation of my tool in place while removing a bushing shown partly broken away. Fig. 2 is a detailed view showing front and side views of driving shank. Fig. 3 shows front and side views of my pivoted tong shaped expander. Fig. 4 denotes my expander without connecting means.

Referring more particularly to the drawings; A represents the driving shank having a wedge formed portion $a$ and driving shoulders $a'$ $a'$; B denotes my bushing supporter or tong shaped expander consisting of rockable arms $b$ $b$ loosely connected by a rivet $b'$ which allows the said arms to swivel on said rivet as well as allowing the driving shoulders $b^2$ $b^2$ to approach each other when bushing supporter B is being inserted through a bushing and to expand when wedge $a$ is inserted therebetween.

As shown in Figure 3 the arms $b$ $b$ below said driving shoulders are semi-circular in outline, and when expanded as shown in Fig. 1 bear upon the interior walls of the bushing C forming a support therefor and prevents collapse of its wall when the driving shoulders $b^2$ $b^2$ are forced against the edge of the bushing.

It will be seen that my bushing supporter or expander may be readily inserted in a conventional type of bushing and then expanded by means of the wedge member, the shoulders of said wedge member abuting the ends of said expander and the shoulders formed on the arms of the expander pressing tightly and positively against the circumference of the conventional bushing thus making a positive connection for driving.

It will also be understood that I do not deem it of importance to have my expander arms connected in any manner except in as much as it makes them easy to handle.

Claim:

A bushing remover comprising opposed rockable members having semi-circular bearings for the interior walls of a bushing; shoulders semi-circular in cross-section formed on said rockable members; a drive shank having a tongue adapted to spread and hold said shoulders in engagement with the end of the bushing and said bearings in engagement with the adjacent inner walls thereof.

In testimony that I claim the foregoing as my own, I affix my signature.

JOHN L. RUDOLPH.